United States Patent
Christo et al.

(10) Patent No.: US 10,747,932 B2
(45) Date of Patent: Aug. 18, 2020

(54) SMART PLACEMENT, VISUALIZATION AND OPTIMIZATION METHODOLOGY FOR COMPONENT PLACEMENT AND PLANNING

(71) Applicant: INTERNATIONAL BUSINESS MACHINES CORPORATION, Armonk, NY (US)

(72) Inventors: Michael A. Christo, Round Rock, TX (US); David L. Green, Austin, TX (US); Julio A. Maldonado, Austin, TX (US); Diana D. Zurovetz, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/100,093

(22) Filed: Aug. 9, 2018

(65) Prior Publication Data
US 2020/0050726 A1 Feb. 13, 2020

(51) Int. Cl.
*G06F 30/392* (2020.01)
*G06F 30/30* (2020.01)
(Continued)

(52) U.S. Cl.
CPC .......... *G06F 30/392* (2020.01); *G06F 30/30* (2020.01); *G06F 2111/04* (2020.01); *G06F 2111/20* (2020.01)

(58) Field of Classification Search
CPC .......... G06F 17/5027; G06F 17/5045; G06F 17/5072; G06F 17/5068; G06F 2206/1008;
(Continued)

(56) References Cited

U.S. PATENT DOCUMENTS

| 5,036,473 A | * | 7/1991 | Butts | G06F 15/7867 |
| | | | | 703/16 |
| 5,740,341 A | * | 4/1998 | Oota | G06F 17/509 |
| | | | | 345/420 |

(Continued)

FOREIGN PATENT DOCUMENTS

| EP | 001354250 | 10/2003 |
| EP | 001365333 | 11/2003 |
| WO | 002056125 | 3/2003 |

OTHER PUBLICATIONS

A. Anke, Jürgen, et al., "A planning method for component placement in smart item environments using heuristic search", IFIP International Conference on Distributed Applications and Interoperable Systems. Springer Berlin Heidelberg, 2007.

*Primary Examiner* — Helen Rossoshek
(74) *Attorney, Agent, or Firm* — Kunzler Bean & Adamson; Bruce R. Needham

(57) ABSTRACT

A child component ID module identifies child components connected to a parent component in response to selection of the parent component for placement on a PCB. The child components identified from component connections of a logic design. A child placement module places the child components around the parent component after placement of the parent component, where each child component is placed in compliance with constraints of the child components. A constraint highlight module identifies, on a PCB layout, an allowable area for component placement and prohibited areas for non-placement after selection of the component. The component is a parent component or a child component identified from component connections of a logic design of an electronic circuit design. The apparatus includes a constraint de-highlight module that removes identification on the PCB layout of the allowable area and (Continued)

the one or more prohibited areas in response to placement of the component.

20 Claims, 11 Drawing Sheets

(51) Int. Cl.
  *G06F 111/04* (2020.01)
  *G06F 111/20* (2020.01)
(58) Field of Classification Search
  CPC ............ G06F 2217/02; G06F 2217/06; G06F 30/392; G06F 2111/04; G06F 2111/20; G06F 30/30
  See application file for complete search history.

(56) References Cited

U.S. PATENT DOCUMENTS

| | | | |
|---|---|---|---|
| 5,745,371 A | 4/1998 | Shouen | |
| 5,912,820 A * | 6/1999 | Kerzman | G06F 17/5077 716/113 |
| 5,920,711 A * | 7/1999 | Seawright | G06F 17/5045 703/15 |
| 5,960,200 A * | 9/1999 | Eager | G06F 8/427 703/13 |
| 6,002,861 A * | 12/1999 | Butts | G06F 17/5027 703/15 |
| 6,691,301 B2 * | 2/2004 | Bowen | G06F 17/5045 712/15 |
| 7,013,445 B1 * | 3/2006 | Teig | G06F 17/5072 716/123 |
| 7,237,219 B2 * | 6/2007 | Ikeda | G06F 17/5068 716/122 |
| 7,437,676 B1 * | 10/2008 | Magdum | H04L 41/024 715/735 |
| 7,530,038 B2 * | 5/2009 | Gristede | G06F 17/5072 716/119 |
| 7,865,857 B1 * | 1/2011 | Chopra | G06F 17/5068 716/119 |
| 7,912,692 B2 * | 3/2011 | Matsushita | G06F 17/5009 703/13 |
| 8,312,405 B1 * | 11/2012 | Slonim | G06F 17/5072 716/116 |
| 8,677,267 B2 * | 3/2014 | Litwiller | G06F 17/241 399/367 |
| 9,304,981 B1 * | 4/2016 | Patidar | G06F 16/24573 |
| 9,317,648 B2 * | 4/2016 | Nakadate | G06F 17/5068 |
| 9,330,224 B2 * | 5/2016 | Ding | G06F 17/5081 |
| 9,904,756 B1 * | 2/2018 | Ruehl | G06F 17/5081 |
| 2003/0182264 A1 | 9/2003 | Wilding et al. | |
| 2003/0182647 A1 | 9/2003 | Radleskog | |
| 2003/0229549 A1 * | 12/2003 | Wolinsky | G06Q 30/0248 705/14.61 |
| 2006/0206850 A1 | 9/2006 | McCubbrey | |
| 2007/0283306 A1 | 12/2007 | Koefferlein et al. | |
| 2012/0284678 A1 | 11/2012 | Huels et al. | |
| 2015/0317425 A1 * | 11/2015 | Ding | G06F 17/5072 716/112 |
| 2016/0058933 A1 * | 3/2016 | Ballantyne | A61M 1/1601 210/85 |
| 2016/0171144 A1 | 6/2016 | Suiter | |

\* cited by examiner

Before

After

SMART PLACEMENT, VISUALIZATION AND OPTIMIZATION METHODOLOGY FOR COMPONENT PLACEMENT AND PLANNING

BACKGROUND

The subject matter disclosed herein relates to printed circuit board layout and more particularly relates to smart placement, visualization and optimization for component placement on a printed circuit board.

Once a logic design is complete for an electronic circuit design, often the next step is to place components of the logic design on a printed circuit board ("PCB"), which is a tedious, lengthy process and often requires much iteration to verify that each component meets mechanical constraints, electrical constraints, etc.

SUMMARY

Apparatuses for component placement on a PCB are disclosed. Computer-implemented methods also perform the functions of the apparatuses. According to an embodiment of the present invention, an apparatus for automatic placement of child components around a parent component includes a child component ID module that identifies one or more child components connected to a parent component in response to a user selecting the parent component. The one or more child components are identified from component connections of a logic design of an electronic circuit design. The user selects the parent component for placement on a PCB. The apparatus includes a child placement module that places the one or more child components around the parent component in response to the user placing the parent component on the PCB, where each child component of the one or more child components is placed with respect to the parent component to be in compliance with one or more constraints of the one or more child components. In some embodiments, at least a portion of the modules include hardware circuits, a programmable hardware device and/or executable code, where the executable code is stored on one or more computer readable storage media.

An apparatus for highlighting an allowable area and prohibited area(s) for a selected component includes a constraint highlight module that identifies, on a PCB layout, an allowable area for a component to be placed and one or more prohibited areas within the allowable area where the component is not to be placed in response to a user selecting the component. The component is a parent component or a child component connected to the parent component. The one or more child components and the parent component are identified from component connections of a logic design of an electronic circuit design. The apparatus includes a constraint de-highlight module that removes identification on the PCB layout of the allowable area and the one or more prohibited areas in response to the user placing the component on the PCB. In some embodiments, at least a portion of the modules include hardware circuits, a programmable hardware device and/or executable code, where the executable code is stored on one or more computer readable storage media.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
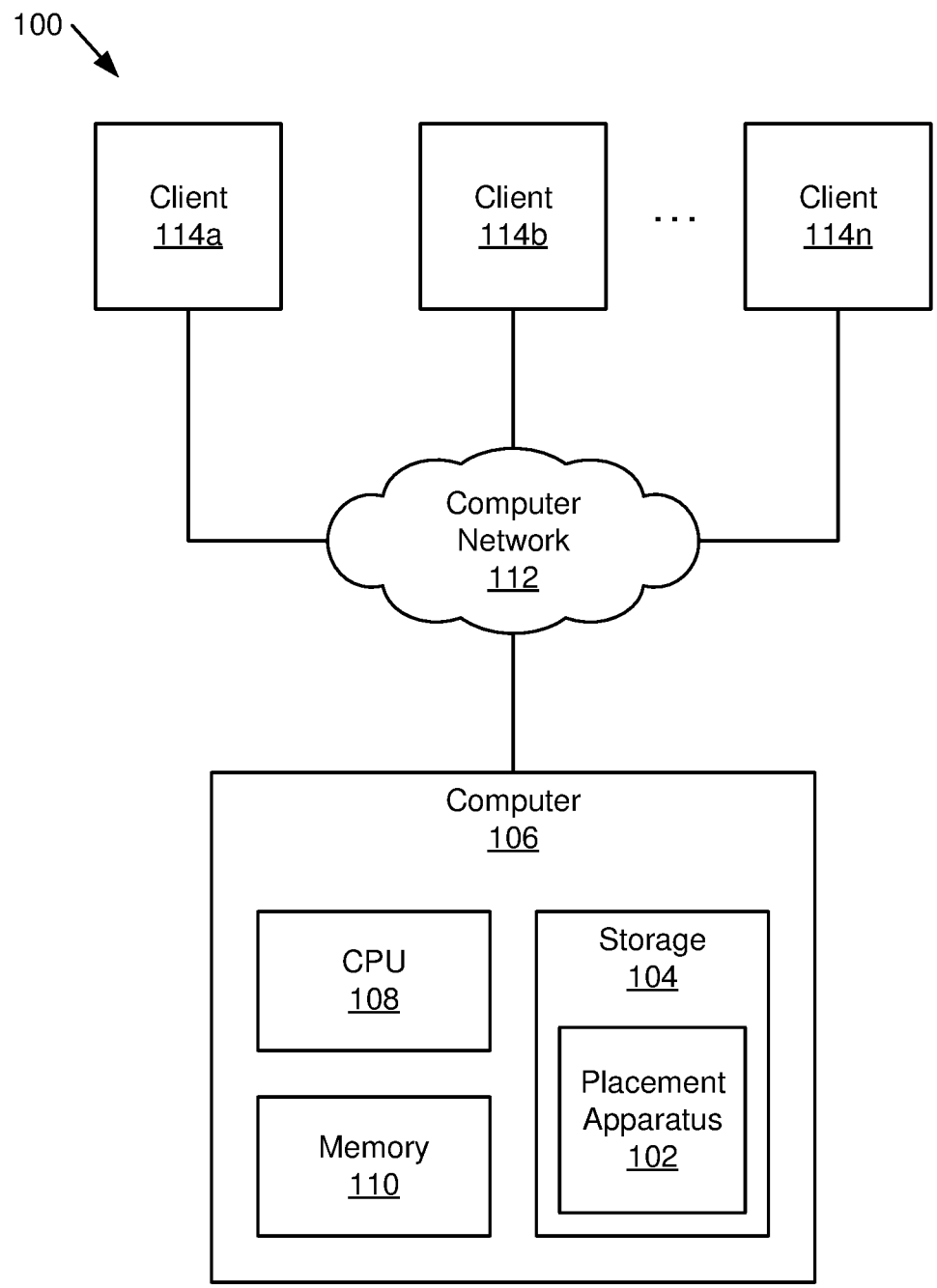
FIG. 1 is a schematic block diagram illustrating one embodiment of a system for placement of components on a printed circuit board.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

According to an embodiment of the present invention, an apparatus for automatic placement of child components around a parent component includes a child component ID module that identifies one or more child components connected to a parent component in response to a user selecting the parent component. The one or more child components are identified from component connections of a logic design of an electronic circuit design. The user selects the parent component for placement on a PCB. The apparatus includes a child placement module that places the one or more child components around the parent component in response to the user placing the parent component on the PCB, where each child component of the one or more child components is placed with respect to the parent component to be in compliance with one or more constraints of the one or more child components. In some embodiments, at least a portion of the modules include hardware circuits, a programmable hardware device and/or executable code, where the executable code is stored on one or more computer readable storage media.

In some embodiments, the apparatus includes a constraint highlight module that identifies, on the PCB, an allowable area for a component to be placed and one or more prohibited areas within the allowable area where the component is not to be placed in response to the user selecting the component. The component is the parent component or a child component of the one or more child components. In other embodiments, the allowable area and the one or more prohibited areas are defined by constraints of components placed on the PCB and/or constraints of the component being placed.

In some embodiments, the child placement module places each child component based on a wiring length constraint between the parent component and the child component. In other embodiments, the wiring length constraint includes a diagonal of a Manhattan distance, an orthogonal distance or a trace length computed based on routing around components and other traces. In other embodiments, the child placement module automatically places each child component in relation to the parent component based on the wiring length constraint and one or more additional constraints. In other embodiments, the child placement module places each child component based on a wiring length constraint and the apparatus includes an additional movement module that highlights one or more child components for further movement that are not in compliance with one or more additional constraints.

In some embodiments, the apparatus includes a child movement module that moves the one or more child components in response to movement of the parent component. The child movement module maintains the one or more child components in a placement pattern around the parent component as the parent component moves and the placement pattern includes locations with respect to the parent component that the child placement module places the one or more child components around the parent component. In other embodiments, the child placement module places the one or more child components around the parent component to be in compliance with one or more constraints of the parent component in addition to the one or more constraints of the one or more child components. In other embodiments, the one or more constraints include not placing a component directly on top of another component, height restrictions, edges of the PCB, spacing between components, a maximum trace length between the parent component and a child component, a signal loss limit, a propagation delay limit and/or an insertion loss limit.

An apparatus for highlighting an allowable area and prohibited area(s) for a selected component includes a constraint highlight module that identifies, on a PCB layout, an allowable area for a component to be placed and one or more prohibited areas within the allowable area where the component is not to be placed in response to a user selecting the component. The component is a parent component or a child component connected to the parent component. The one or more child components and the parent component are identified from component connections of a logic design of an electronic circuit design. The apparatus includes a constraint de-highlight module that removes identification on the PCB layout of the allowable area and the one or more prohibited areas in response to the user placing the component on the PCB. In some embodiments, at least a portion of the modules include hardware circuits, a programmable hardware device and/or executable code, where the executable code is stored on one or more computer readable storage media.

In some embodiments, selected component is a parent component and the apparatus includes a child component ID module that identifies one or more child components connected to a parent component in response to a user selecting the parent component a child placement module that places the one or more child components around the parent component in response to the user placing the parent component on the PCB. Each child component of the one or more child components is placed with respect to the parent component to be in compliance with one or more constraints of the child component. In other embodiments, the child placement module places each child component based on a wiring length constraint between the parent component and the child component and the child placement module places each child component based on a wiring length constraint and the apparatus includes an additional movement module that highlights one or more child components for further movement that are not in compliance with one or more additional constraints.

In some embodiments, the allowable area and the one or more prohibited areas are defined by constraints of components placed on the PCB and/or constraints of the component being placed. In other embodiments, the apparatus includes a component level module that, in response to the user selecting a component, identifies component levels by identifying each component in a level differently than components in other levels. Each level is distinguished by parent-child connections between components of the logic design and the selected component is identified in a parent level.

A computer-implemented method for automatic placement of child components around a parent component includes identifying one or more child components connected to a parent component in response to a user selecting the parent component. The one or more child components are identified from component connections of a logic design of an electronic circuit design. The user selects the parent component for placement on a PCB. The method includes placing the one or more child components around the parent component in response to the user placing the parent component on the PCB. Each child component of the one or more child components is placed with respect to the parent component to be in compliance with one or more constraints of the one or more child components.

In some embodiments, the computer-implemented method includes identifying, on the PCB, an allowable area for a component to be placed and one or more prohibited areas within the allowable area where the component is not to be placed in response to the user selecting the component. The component includes the parent component or a child component of the one or more child components. The allowable area and the one or more prohibited areas are defined by one or more of constraints of components placed on the PCB and constraints of the component being placed. In other embodiments, the computer-implemented method includes moving the one or more child components in response to movement of the parent component. The one or more child components are maintained in a placement pattern around the parent component as the parent component moves and the placement pattern includes locations with respect to the parent component where the one or more child components are placed around the parent component based on one or more constraints of the child components.

Another computer-implemented method for highlighting an allowable area and prohibited area(s) for a selected component includes identifying, on a PCB layout, an allowable area for a component to be placed and one or more prohibited areas within the allowable area where the component is not to be placed in response to a user selecting the component. The component includes a parent component or a child component connected to the parent component and the one or more child components and the parent component are identified from component connections of a logic design of an electronic circuit design. The method includes removing identification on the PCB layout of the allowable area and the one or more prohibited areas in response to the user placing the component on the PCB.

In some embodiments, the selected component is a parent component and the method includes identifying one or more child components connected to a parent component in response to a user selecting the parent component, and placing the one or more child components around the parent component in response to the user placing the parent component on the PCB. Each child component of the one or more child components is placed with respect to the parent component to be in compliance with one or more constraints of the child component.

FIG. 1 is a schematic block diagram illustrating one embodiment of a system 100 for placement of components on a printed circuit board. The system 100 includes a placement apparatus 102 in computer storage 104 in a computer 106 with a CPU 108 and memory 110, a computer network 112 and clients 114a-114n (collectively or individually "114"), which are described below.

The system 100 includes a placement apparatus 102, which identifies one or more child components connected to a parent component when the parent component is selected, moving the child components as the selected parent component is moved and then placing the child components around the parent component based on one or more constraints of the child components. The placement apparatus 102, in response to selection of a component, may also highlight on a printed circuit board ("PCB") an allowable area for the component to be placed and prohibited areas where the component should not be placed on the PCB based on constraints of the component and other components connected to the selected component. The placement apparatus 102 is described further in relation to the apparatuses 200, 300 of FIGS. 2 and 3.

While the placement apparatus 102 is depicted in computer storage 104, such as a hard disk drive, flash memory or other non-volatile storage, all or a portion of the placement apparatus 102 may be located elsewhere, such as in a storage area network, cloud storage, network attached storage or other computer data storage external to the computer 102. In addition, all or a portion of the placement apparatus 102 may be located in memory 110, such as cache, random access memory ("RAM") or other non-volatile memory 110 accessible by the central processing unit ("CPU") 108. The computer storage 104 may take the form of a hard disk drive, solid state storage, optical storage and the like or may be external to the computer 106.

The computer 106 may be a server, a workstation, a desktop computer, a laptop computer, a mainframe computer or other computing device capable of running the placement apparatus 102. In some embodiments, the computer 106 is a dedicated computing device configured to operate, execute, etc. the placement apparatus 102. In some embodiments, the computer 106 includes one or more CPUs 108 or a CPU with two or more cores. In some embodiments, the placement apparatus 102 may run on a virtual machine in a partition configured using one or more CPUs or cores of a server. One of skill in the art will recognize other computers 106 capable of running the placement apparatus 102.

In some embodiments, the computer 106 is a server connected to one or more clients 114 through a computer network 112. The computer network 112 may include a LAN, a WAN, a fiber network, the Internet, a wireless network, or a combination of networks. A client 114 may be any form of computer capable of connecting to the server and may be used to control execution of the placement apparatus 102. One of skill in the art will recognize other computers 106 and computing environments appropriate for execution of the placement apparatus 102. In addition, all or a portion of the placement apparatus 102 may be implemented using hardware circuits and/or a programmable hardware device. For example, all or a portion of the placement apparatus 102 may be implemented using an FPGA. In another example, all or a portion of the placement apparatus 102 may be implemented using one or more hardware circuits. One of skill in the art will recognize other ways that the placement apparatus 102 may be implemented.

Figure 2:
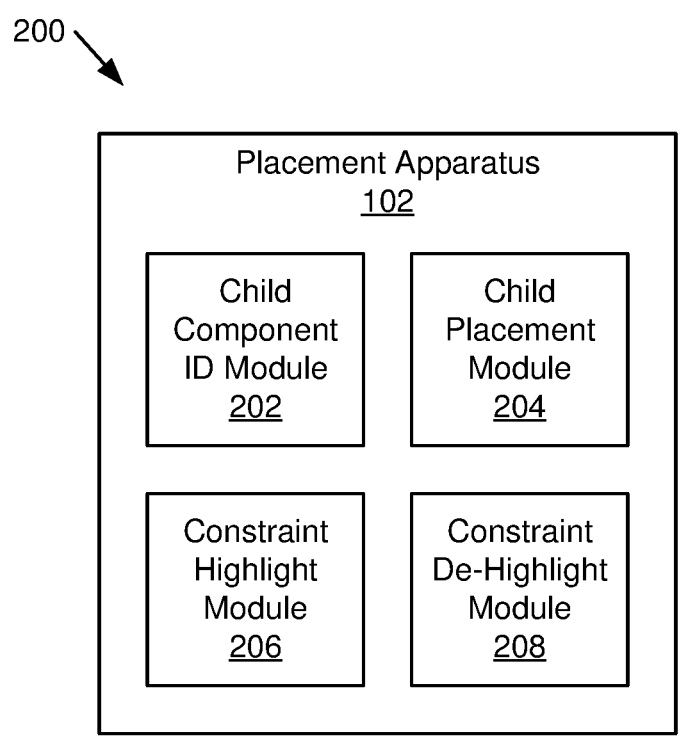
FIG. 2 is a schematic block diagram illustrating one embodiment of an apparatus for placement of components on a printed circuit board.

FIG. 2 is a schematic block diagram illustrating one embodiment of an apparatus 200 for placement of components on a printed circuit board. The apparatus 200 includes one embodiment of the placement apparatus 102 that includes a child component ID module 202, a child placement module 204, a constraint highlight module 206 and a constraint de-highlight module 208, which are described in more detail below.

The apparatus 200 includes a child component ID module 202 that identifies one or more child components connected to a parent component in response to a user selecting the parent component. The one or more child components are identified from component connections of a logic design of an electronic circuit design. The user selects the parent component for placement on a PCB. Typically, once a logic design is complete for an electronic circuit design, a next step is to place the components on a PCB, which can be a daunting, tedious task. Each component typically has constraints and each connected component also typically has constraints. The constraints may be trace length, height restrictions, propagation delay, and the like. Each component connected to another component should be placed to comply with the various constraints.

A component may be parent component and may also be a child component. A parent-child component relationship includes a connection between components. For example, a child component is connected to an output of a parent component. In another example, a signal from a parent component flows to a child component. In another example, a parent component is a more complex component, which may be called module, and is connected to child components that support the parent component. For example, a parent component or module may be a processor module, a clock generator, a universal serial bus ("USB") host controller or other similar complex components. A child component may be a resistor, a capacitor, an inductor, a transistor, etc. In other embodiments, a parent component is connected to another parent component.

In another example, a parent component is a selected component while a child component is defined by a connection to the selected parent component. For example, a user may select a processor module that is connected to resistors, capacitors, etc., which may be connected to the processor module to set timing limits, create ramp signals, select processor options, and which may also connect to other components. Once the parent component, which is a processor module in this case is placed, a user may then select a child component, such as a resistor, for further placement, which may then become a parent component to one or more other components to which the resistor is connected. The one or more other components then become child components for the resistor. One of skill in the art will recognize other parent-child relationships useful to the placement apparatus 102.

Once a parent component is selected, the child component ID module 202 identifies child components of the selected parent component using the logical design of the electronic circuit design that has components being placed on a PCB. In one embodiment, the child component ID module 202 identifies all components connected to the selected parent component as child components, which may include one or more already placed components, components not yet placed, discrete components such as resistors, capacitors, transistors, etc., and may include one or more complex components. In another embodiment, the child component ID module 202 identifies a portion of the components connected to the selected parent component. In one example, the child component ID module 202 excludes already placed components connected to the parent component. In another example, the child component ID module 202 excludes complex components and modules. One of skill in the art will recognize child components excluded by the child component ID module 202.

The apparatus 200 includes a child placement module 204 that places the one or more child components around the parent component in response to the user placing the parent component on the PCB. Each child component of the one or more child components is placed with respect to the parent component to be in compliance with one or more constraints of the one or more child components. In one example, the user places the selected parent component on the PCB and the child placement module 204 places the child components identified by the child component ID module 202 near the parent component so that the child components are in compliance with one or more constraints of the child component. In another embodiment, the child placement module 204 also includes constraints of the parent component.

In some embodiments, the child placement module 204 places each child component based on a wiring length constraint between the parent component and the child component. In some examples, the child placement module 204 ignores other constraints and uses only the constraint of wiring length for placement of the one or more child components. The placement apparatus 102 may highlight each child component for further movement as described below in relation to the additional movement module 302 described below in relation the apparatus 300 of FIG. 3.

The constraints considered by the child placement module 204 may include mechanical constraints, electrical constraints, etc. For example, a constraint may include not placing a component directly on top of another component, a height restriction, edges of the PCB, spacing between components, a maximum trace length between the parent component and a child component, a signal loss limit, a propagation delay limit, an insertion loss limit and the like. A height restriction constraint may be due to other components above the PCB, air flow restrictions, etc. The spacing between components may be for heat flow, may be based on mechanical limits of component placement, etc. The maximum trace length constraint may be due to trace resistance, propagation delay, etc. One of skill in the art will recognize other constraints and placement of the child components around the parent component based on the constraints.

The apparatus 200 includes a constraint highlight module 206 that identifies, on a PCB layout, an allowable area for a component to be placed and one or more prohibited areas within the allowable area where the component is not to be placed in response to a user selecting the component. The component is a parent component or a child component connected to the parent component. The one or more child components and the parent component are identified from component connections of a logic design of an electronic circuit design. In some examples, the allowable area and the one or more prohibited areas are defined by one or more of constraints of components placed on the PCB and constraints of the component being placed.

For example, the allowable area may be defined by a maximum trace length between the parent component and a child component. The maximum trace length constraint may be defined in multiple ways and may result in a circle. The circle, in one embodiment, is a connection point on the parent component where a child component is connected. In one example, the maximum trace length is defined as a Manhattan distance, which is a general maximum trace length considering that the traces will be routed orthogonally. Considering all possible trace routes that result in the maximum trace length typically results in a shape, such as a circle. In another embodiment, the maximum trace length is defined as an orthogonal distance limit. In another embodiment, the maximum trace length is defined by an actual possible trace length considering other placed components, traces, etc.

In some embodiments, within the allowable area, the constraint highlight module 206 highlights one or more prohibited areas where the component should not be placed. The prohibited areas within the allowable area may include areas over components where the component may not be placed, areas outside the PCB, areas close to a component that would violate a component spacing limit, and the like. In other embodiments, the constraint highlight module 206 highlights an area outside the allowable area as a prohibited area. In other embodiments, the area outside the allowable area may not be highlighted. For example, the area outside the allowable area may be known to a user to be off limits for component placement.

The apparatus 200 includes, some embodiments, a constraint de-highlight module 208 that removes identification on the PCB layout of the allowable area and the one or more prohibited areas in response to the user placing the component on the PCB. De-highlighting the allowable area and the one or more prohibited areas allows a user to view the PCB after placement without the allowable area and prohibited area(s) for placement of a next component which will have a different allowable area and different prohibited area(s).

In some embodiments, the constraint highlight module 206 highlights the allowable area by a line around the allowable area. In other embodiments, the constraint highlight module 206 highlights the allowable area by a fill within the allowable area defined by a color and/or a pattern. In other embodiments, the color and/or pattern is transparent at some level to allow a user to continue to view what is under the allowable area.

In some embodiments, the constraint highlight module 206 highlights the one or more prohibited areas by a line around the prohibited area(s) and may also highlight the one or more prohibited areas with a color and/or pattern. For example, the constraint highlight module 206 may define the allowable area with a green line around the allowable area while highlighting the prohibited area(s) with red hatching.

Figure 3:
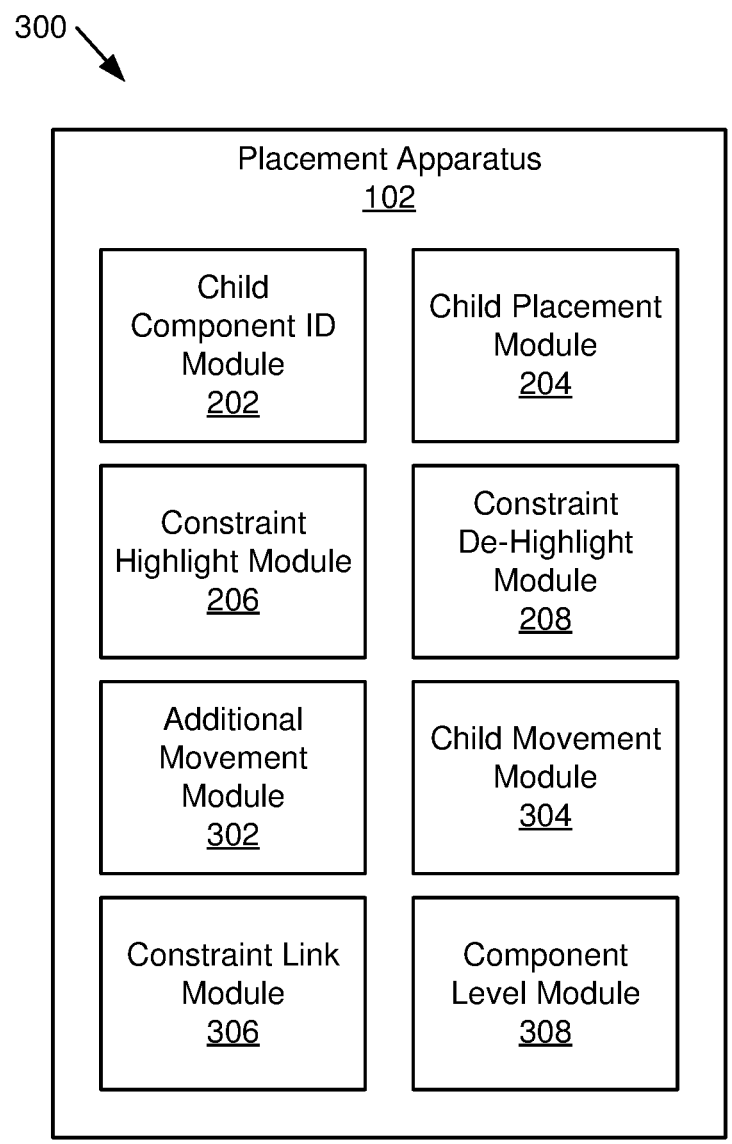
FIG. 3 is a schematic block diagram illustrating another embodiment of an apparatus for placement of components on a printed circuit board.

FIG. 3 is a schematic block diagram illustrating another embodiment of an apparatus 300 for placement of components on a printed circuit board. The apparatus 300 includes another embodiment of the placement apparatus 102 with a child component ID module 202, a child placement module 204, a constraint highlight module 206 and a constraint de-highlight module 208, which are substantially similar to those described above in relation to the apparatus 200 of FIG. 2. The apparatus 300 also includes an additional movement module 302, a child movement module 304, a constraint link module 306 and/or a component level module 308, which are described below.

In some embodiments, the child placement module 204 places each child component based on a wiring length constraint and the apparatus 300 includes an additional movement module 302 that highlights one or more child components for further movement that are not in compliance with one or more additional constraints. For example, the child placement module 204 may place a child placement in a location that violates one or more constraints. The additional movement module 302 may then highlight the child component in a way that the user will understand that the child component should be moved further. The user may then select the child component and the constraint highlight module 206 then highlights an allowable area and one or more prohibited areas based on the violated constraints.

For example, the child placement module 204 may place the child component at a maximum trace length which violates a propagation delay constraint and/or a signal loss constraint so that the additional movement module 302 then highlights the child component in a way that the user understands that further movement of the child component is desirable. The user then selects the component and the constraint highlight module 206 then highlights an allowable area along with prohibited area(s) based on the violation of the propagation delay constraint and/or violation of the signal loss constraint. The additional movement module 302 may highlight one or more child components for movement using a different color, a hatch pattern, etc.

The apparatus 300, in some embodiments, includes a child movement module 304 that moves the one or more child components in response to movement of the parent component. The child movement module 304, in some embodiments, maintains the one or more child components in a placement pattern around the parent component as the parent component moves where the placement pattern includes locations with respect to the parent component that the child placement module 204 places the one or more child components around the parent component. For example, the child placement module 204 may determine a layout of child components around the selected parent component and the child movement module 304 then maintains this placement around the parent component as the user moves the parent component.

The apparatus 300, in some embodiments, includes a constraint link module 306 that links each component in the logic design to one or more constraints of the components. For example, the logic design typically includes a specification of a particular model, number, size, etc. for each component and may link to a component library that includes constraints. The constraint link module 306, in one embodiment, links the placement apparatus 102 to the constraints in the component library based on the components of the logic design. In another embodiment, the logic design includes the constraints and the constraint link module 306 links the placement apparatus 102 to the constraints in the logic design. In another embodiment, the constraint link module 306 downloads the constraints into the placement apparatus 102 from a component library, from the logic design, from one or more websites, etc. One of skill in the art will recognize other ways that the constraint link module 306 can link to or load applicable constraints.

The apparatus 300, in some embodiments, includes a component level module 308 that, in response to the user selecting a component, identifies component levels by identifying each component in a level differently than components in other levels. Each level is distinguished by parent-child connections between components of the logic design and the selected component is identified in a parent level. For example, the component level module 308 may identify a parent component with one color and child components at each level with other colors. In other embodiments, the component level module 308 distinguishes between levels using patterns on the component displays.

A parent is one level while child components are on a different level. In some embodiments, the child components are distinguished by different levels. For example, one child level may be components directly connected to the parent component while other child components may be connected to the child components that connect to the parent component. In other embodiments, some child components on different levels may be of different types. For example, discrete components may be on a level while a complex component that is a module may be on a different level. In addition, the component level module 308 may not highlight or may highlight differently other components that are already placed, were parent components to the selected parent component, are on a same level as the selected component, etc. but are not parent or child components, and the like. One of skill in the art will recognize other levels and ways that the component level module 308 may distinguish between components of different levels.

Figure 4:
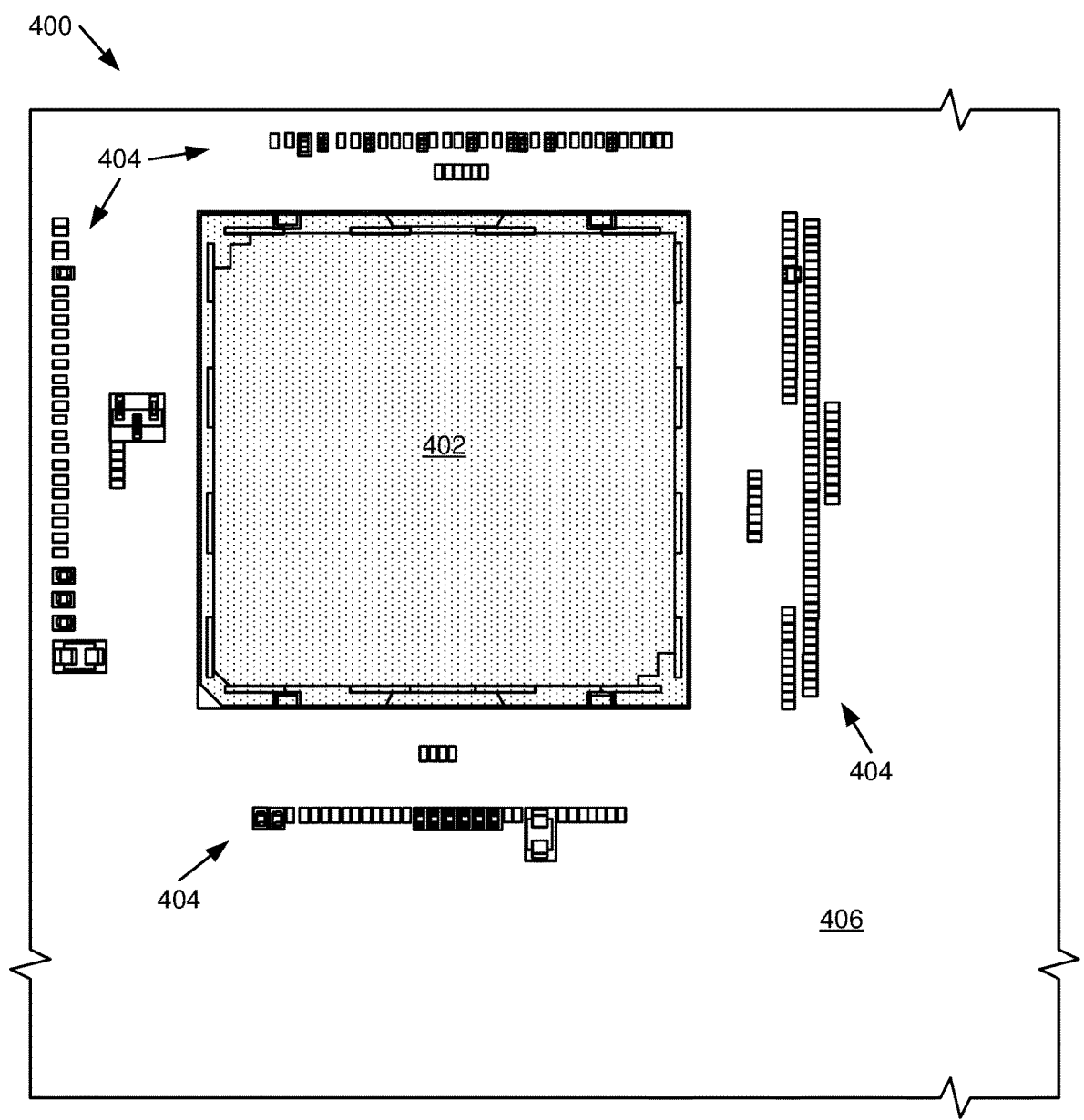
FIG. 4 is a schematic block diagram illustrating a parent component and child components placed on a printed circuit board.

FIG. 4 is a schematic block diagram 400 illustrating a parent component 402 and child components 404 placed on a printed circuit board 406. The parent component 402 is a module or complex component where the child components 404 are discrete components. In some embodiments, the child components 404 were placed by the child placement module 204 around the parent component 402 after the child component ID module 202 identified the child components 404 when the parent component 402 was selected. In some embodiments, the child movement module 304 moved the child components 404 in the same placement pattern as is depicted in FIG. 4 as the parent component 402 was moved. The additional movement module 302 may highlight (not depicted) some of the child components 404 as requiring additional movement to comply with additional constraints.

Figure 5:
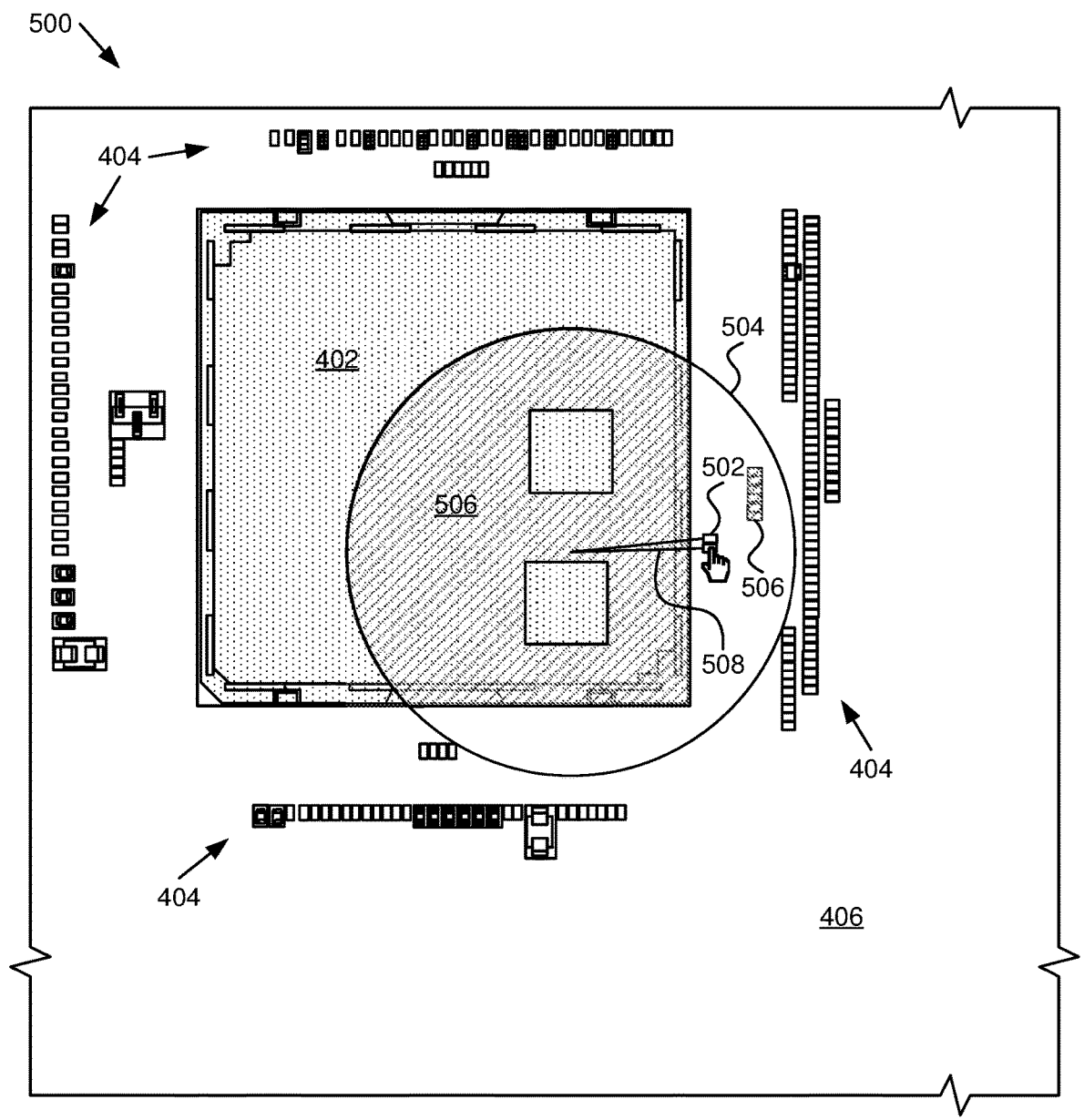
FIG. 5 is a schematic block diagram illustrating a parent component and two selected child components being moved on a printed circuit board and areas where the child components should and should not be placed.

FIG. 5 is a schematic block diagram 500 illustrating a parent component 402 and two selected child components 502 being moved on a printed circuit board 406 and areas where the child components 502 should and should not be placed. The areas where the child components 502 should and should not be placed include an allowable area 504 where the child components 502 may be placed and a prohibited areas 506 within the allowable area 504 where the child components 502 should not be placed. Lines 508 are included displaying a connection to the parent component 402. The lines 508 may or may not be actual traces, but are useful to indicate a connection to the parent component 402.

Figure 6:
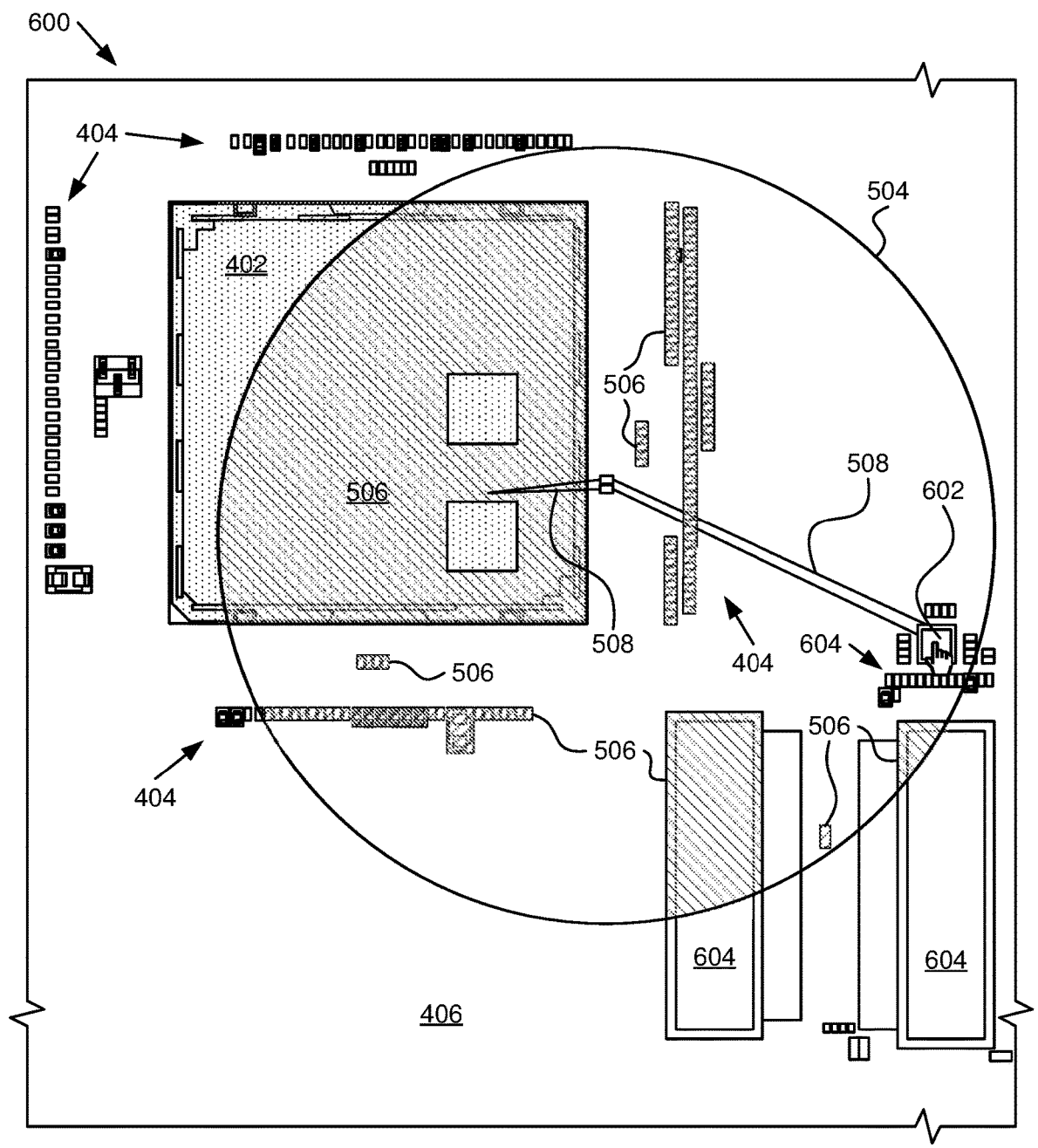
FIG. 6 is a schematic block diagram illustrating a parent component and accompanying child components being moved on a printed circuit board and areas where the parent component and child components should and should not be placed.

FIG. 6 is a schematic block diagram 600 illustrating another a parent component 602 and accompanying child components 604 being moved on a printed circuit board 406 and areas 504, 506 where the parent component 602 and child components 604 should and should not be placed. The parent component 602 is selected by the user so that the child component ID module 202 identifies child components 604 of the parent component 602 and the child placement module 204 places the child components 604 around the parent component 602 while the child movement module 304 moves the child components 604 with the parent component 602 while the parent component 602 is being moved by the user. The prohibited areas 506 are expanded to include areas over other child components 404 of the previous parent component 402 and other placed child components 604.

Figure 7:
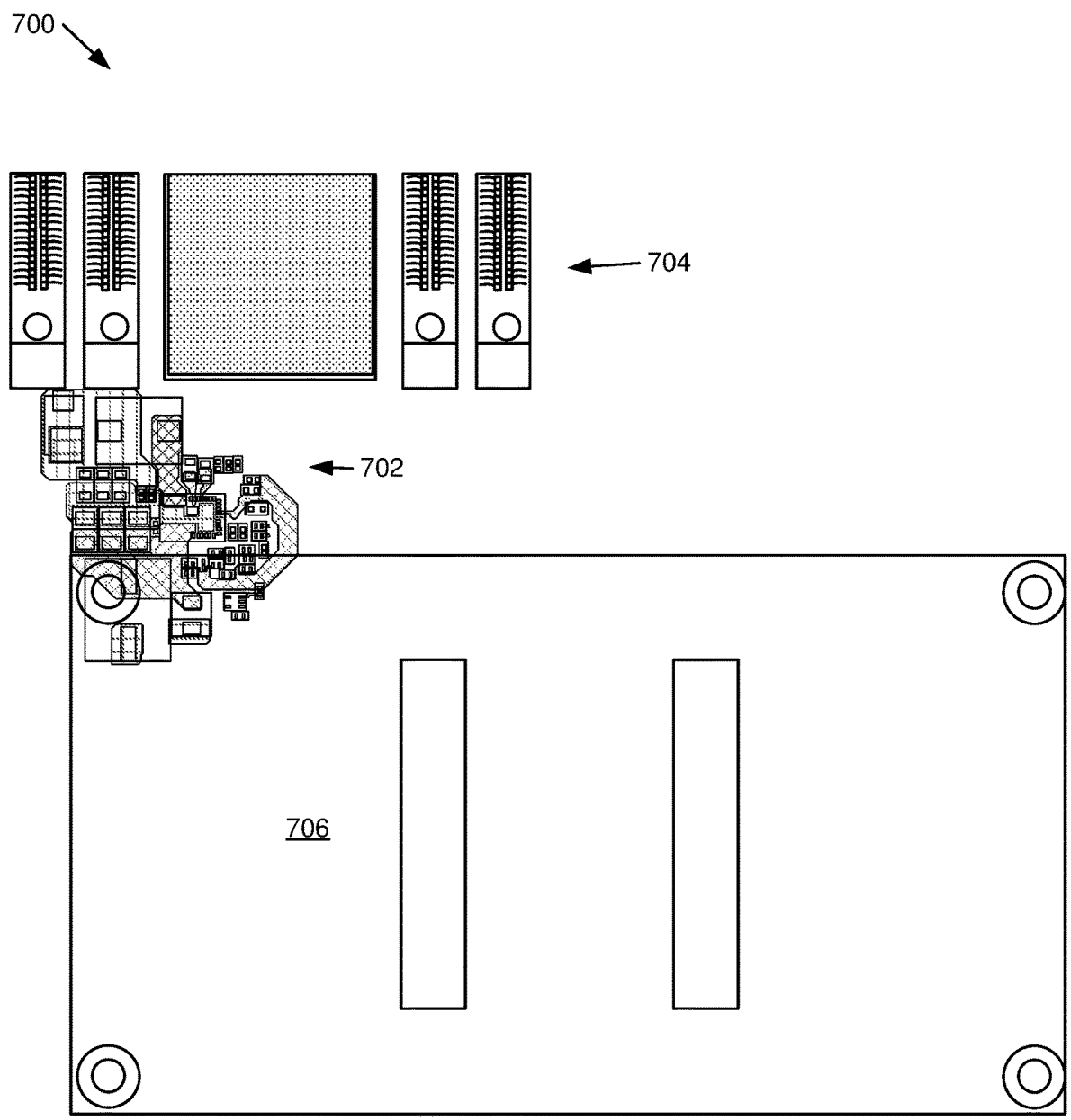
FIG. 7 is a schematic block diagram illustrating a component collision with other components.

FIG. 7 is a schematic block diagram 700 illustrating a component collision with other components. The diagram 700 includes a previously placed parent and child components 702 placed next to other components 704 and a newly placed component 706 that collides with the parent and child components 702. Note that the newly placed component 706 is over top of the parent and child components 702.

Figure 8:
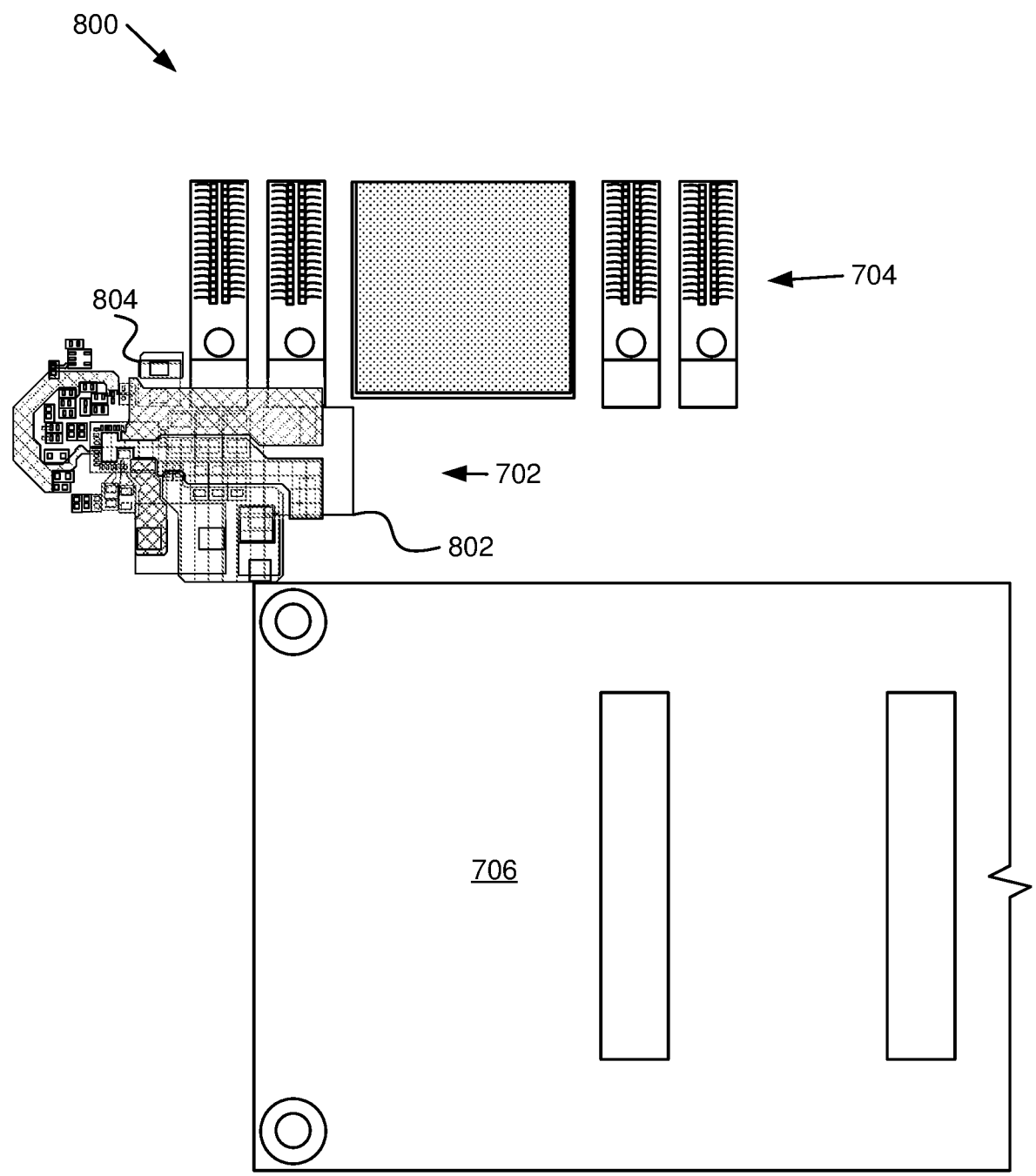
FIG. 8 is a schematic block diagram illustrating components automatically rearranged after a component collision with other components.
Figure 9:
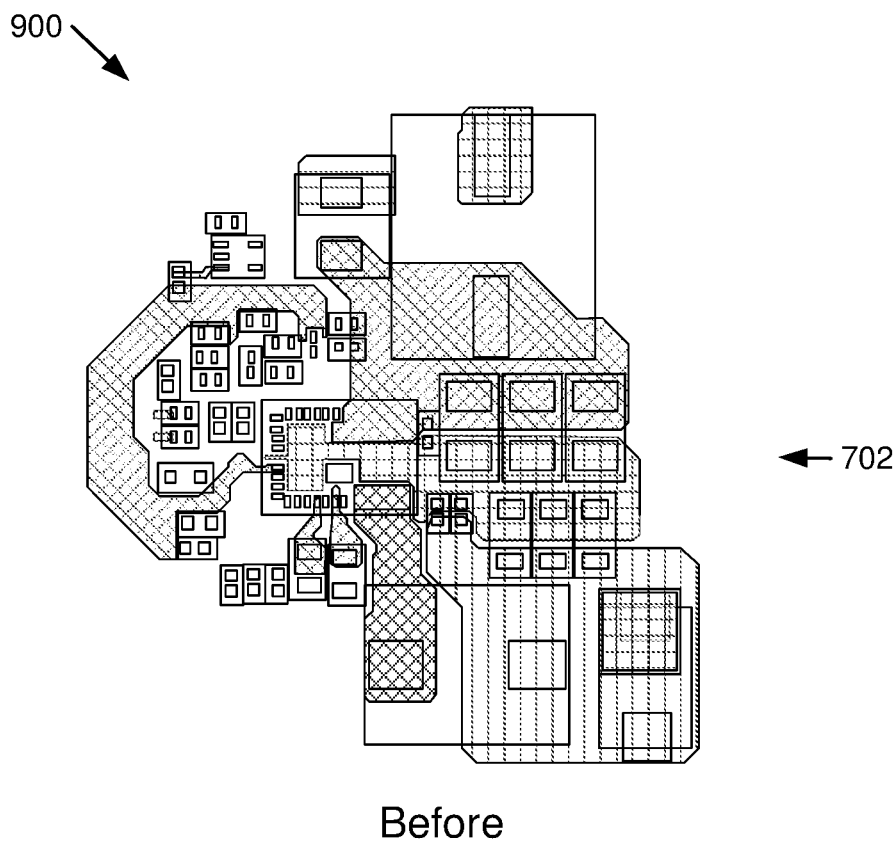
FIG. 9 is a schematic block diagram illustrating the components of FIG. 7 before rearrangement and the components of FIG. 8 after rearrangement.
Figure 9:
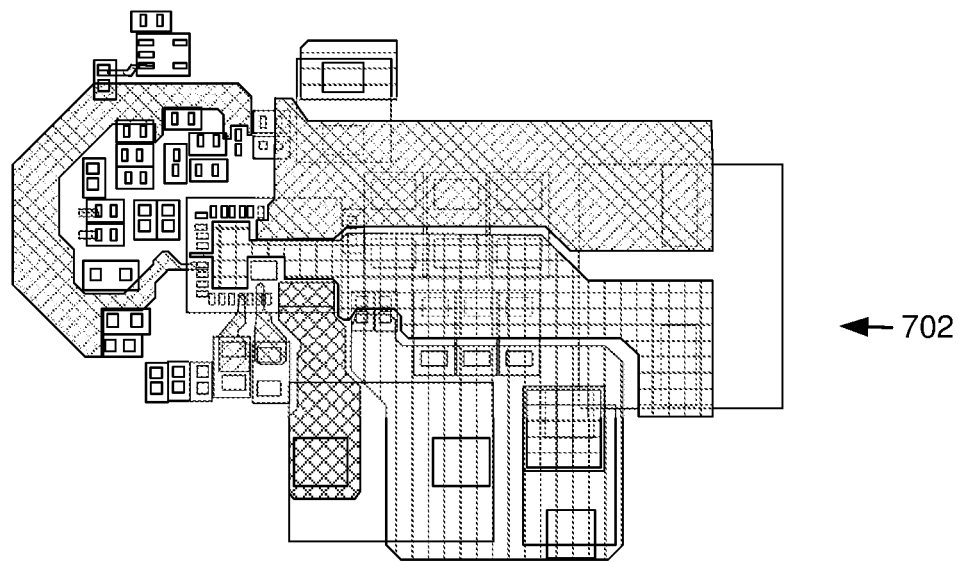

FIG. 8 is a schematic block diagram 800 illustrating components automatically rearranged after a component collision with other components. The diagram illustrates how the parent and child components 702 have been moved to accommodate the newly placed component 706. In one embodiment, upon selection of the parent component of the parent and child components 702, the child placement module 204 detects the collision with the newly placed component 706 and rearranges the parent and child components 702 by rotating a 0.9 volt regulator 802 by 180 degrees and moving the regulator 802 and moving an input capacitor 804, which eliminates the collision when the parent and child components 702 are moved. FIG. 9 is a schematic block diagram 900 illustrating the parent and child components 702 of FIG. 7 before rearrangement and the components of FIG. 8 after rearrangement.

Figure 10:
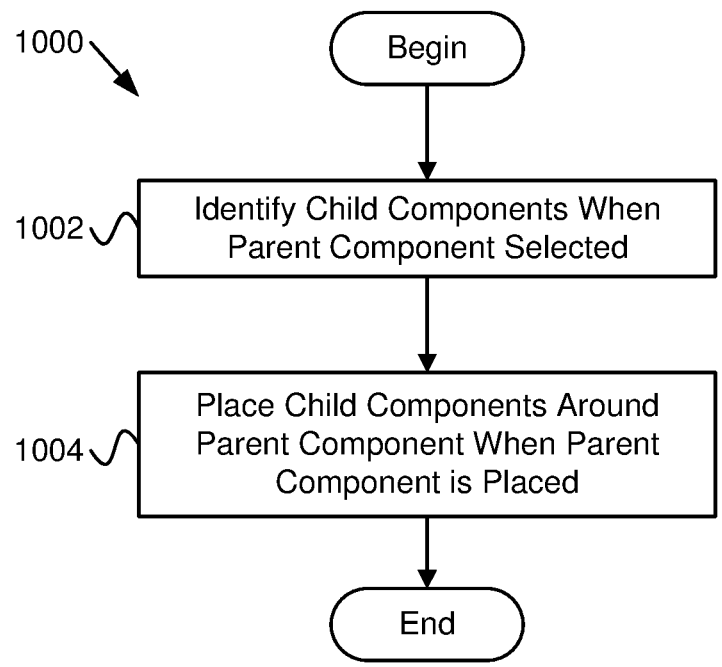
FIG. 10 is a schematic flow chart diagram illustrating one embodiment of a method for placement of child components with respect to a selected parent component on a printed circuit board.

FIG. 10 is a schematic flow chart diagram illustrating one embodiment of a method 1000 for placement of child components with respect to a selected parent component on a printed circuit board. The method 1000 begins and identifies 1002 one or more child components (e.g. 404) connected to a parent component (e.g. 402) in response to a user selecting the parent component 402. The one or more child components 404 are identified from component connections of a logic design of an electronic circuit design. The user selects the parent component for placement on a PCB (e.g. 406). The method 1000 places 1004 the one or more child components 404 around the parent component 402 in response to the user placing the parent component 402 on the PCB 406, and the method 1000 ends. Each child component of the one or more child components 404 is placed with respect to the parent component 402 to be in compliance with one or more constraints of the one or more child components 404. In some embodiments, the child component ID module 202 and the child placement module 204 implement one or more steps of the method 1000.

Figure 11:
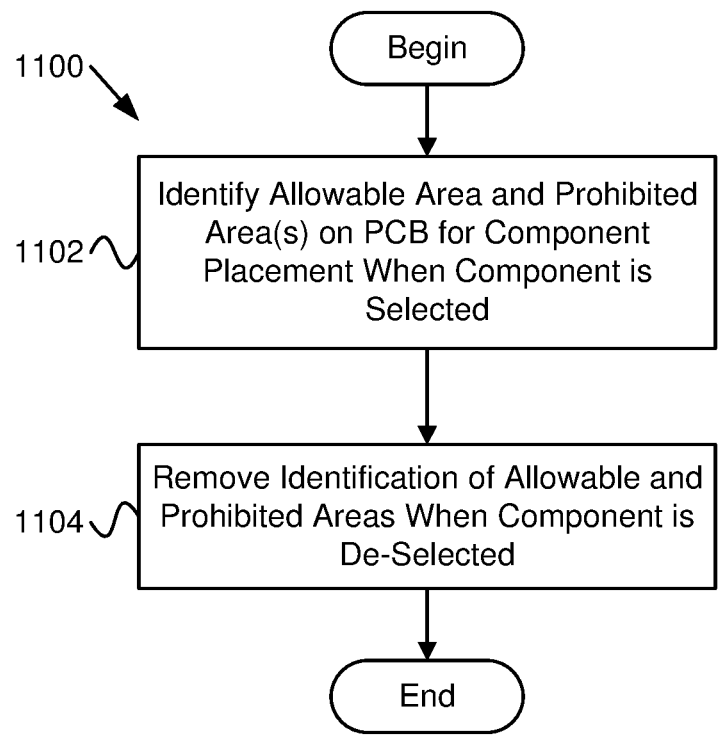
FIG. 11 is a schematic flow chart diagram illustrating one embodiment of a method for identifying an allowable area for component placement and prohibited areas for component placement for a component selected for placement on a printed circuit board.

FIG. 11 is a schematic flow chart diagram illustrating one embodiment of a method 1100 for identifying an allowable area for component placement and prohibited areas for component placement for a component selected for placement on a printed circuit board. The method 1100 begins and identifies 1102, on a PCB (e.g. 406) layout, an allowable area (e.g. 504) for a component (e.g. 502) to be placed and one or more prohibited areas (e.g. 506) within the allowable area 504 where the component 502 is not to be placed in response to a user selecting the component 502. The component 502 is a parent component or a child component connected to the parent component. The one or more child components and the parent component are identified from component connections of a logic design of an electronic circuit design. The method 1100 removes 1104 identification on the PCB layout of the allowable area 504 and the one or more prohibited areas 506 in response to the user placing the component on the PCB, and the method 1100 ends. In some embodiments, the constraint highlight module 206 and the constraint de-highlight module 208 implement one or more steps of the method 1100.

Figure 12:
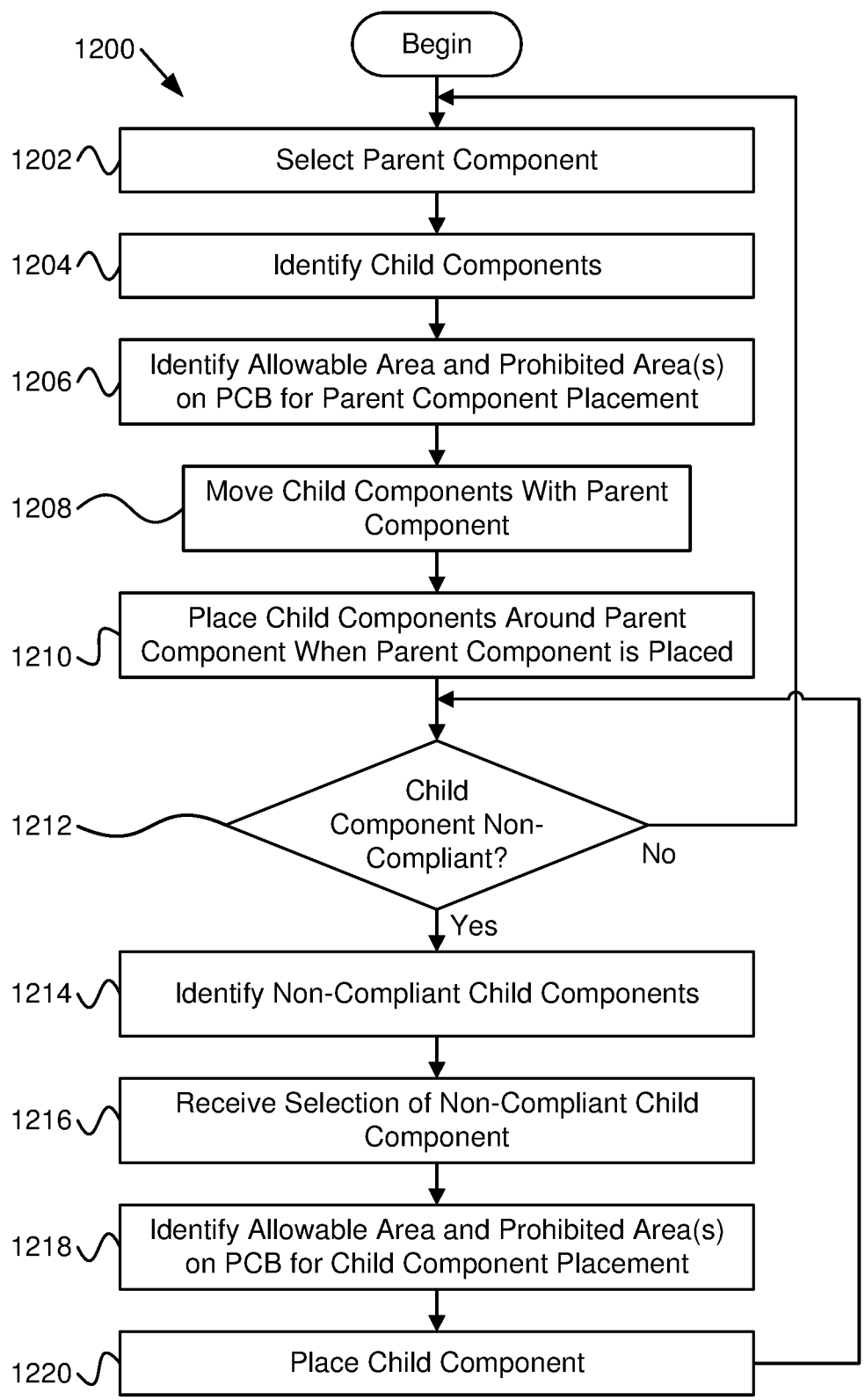
FIG. 12 is a schematic flow chart diagram illustrating one embodiment of a method for identifying child components of a selected parent component and moving the child components with the parent component and identifying an allowable area for component placement and prohibited areas for component placement for a child component selected for placement on a printed circuit board with respect to the parent component.

FIG. 12 is a schematic flow chart diagram illustrating one embodiment of a method 1200 for identifying child components of a selected parent component and moving the child components with the parent component and identifying an allowable area for component placement and prohibited areas for component placement for a child component selected for placement on a printed circuit board with respect to the parent component. The method 1200 begins and selects 1202 a parent component (e.g. 602) and identifies 1204 one or more child components (e.g. 604) connected to the parent component 602 in response to a user selecting the parent component 602. The one or more child components 604 are identified from component connections of a logic design of an electronic circuit design. The user selects the parent component 602 for placement on a PCB (e.g. 406).

The method 1200 identifies 1206, on the PCB layout 406, an allowable area 504 for the parent component 602 to be placed and prohibited areas 506 within the allowable area 504 where the parent component 602 is not to be placed in response to a user selecting the parent component 602. The method 1200 moves 1208 the child components 604 with the parent component 602 and places 1210 the child components 604 around the parent component 602 when the parent component 602 is placed.

The method 1200 determines 1212 if a child component 604 is not compliant with one or more constraints of the child components 404, 604 and/or parent components 402, 602. If the method 1200 determines 1212 that a child component 604 is not compliant with one or more constraints of the child components 404, 604 and/or parent components 402, 602, the method 1200 identifies 1214 non-compliant child components 604 and receives 1216 a selection of a non-compliant child component 604. The method 1200 identifies 1218 an allowable area 504 and prohibited areas 506 on the PCB 406 for placement of the child component 604 and places 1220 the child component 604 in response to user input. The method 1200 returns and determines 1212 if a child component 604 is not compliant with one or more constraints of the child components 404, 604 and/or parent components 402, 602.

If the method 1200 determines 1212 that the child component 604 is not compliant with one or more constraints of the child components 404, 604 and/or parent components 402, 602, the method 1200 returns to select 1202 another parent component 602 for movement. In some embodiments, the child component ID module 202, the child placement module 204, the constraint highlight module 206, the constraint de-highlight module 208, the additional movement module 302, the child movement module 304, the constraint link module 306 and the component level module 308 implement one or more steps of the method 1200.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a child component ID module that identifies one or more child components connected to a parent component in response to a user selecting the parent component, the one or more child components identified from component connections of a logic design of an electronic circuit design, wherein the user selects the parent component for placement on a printed circuit board ("PCB"), wherein identifying the one or more child components comprises excluding a component already placed on the PCB layout and connected to the parent component, wherein the child component supports the operation of the parent component and electrical signaling flows between the parent component and the child component; and
a child placement module that places the one or more child components around the parent component in response to the user placing the parent component on the PCB, wherein each child component of the one or more child components is placed with respect to the parent component to be in compliance with one or more constraints of the one or more child components,
wherein at least a portion of said modules comprise one or more of hardware circuits, a programmable hardware device and executable code, the executable code stored on one or more computer readable storage media.

2. The apparatus of claim 1, further comprising a constraint highlight module that identifies, on the PCB, an allowable area for a component to be placed and one or more prohibited areas within the allowable area where the component is not to be placed in response to the user selecting the component, the component comprising one of the parent component and a child component of the one or more child components.

3. The apparatus of claim 2, wherein the allowable area and the one or more prohibited areas are defined by one or more of constraints of components placed on the PCB and constraints of the component being placed.

4. The apparatus of claim 1, wherein the child placement module places each child component based on a wiring length constraint between the parent component and the child component.

5. The apparatus of claim 4, wherein the wiring length constraint comprises one of a diagonal of a Manhattan distance, an orthogonal distance and a trace length computed based on routing around components and other traces.

6. The apparatus of claim 4, wherein the child placement module automatically places each child component in relation to the parent component based on the wiring length constraint and one or more additional constraints.

7. The apparatus of claim 4, wherein the child placement module places each child component based on a wiring length constraint and further comprising an additional movement module that highlights one or more child components for further movement that are not in compliance with one or more additional constraints.

8. The apparatus of claim 1, further comprising a child movement module that moves the one or more child components in response to movement of the parent component, wherein the child movement module maintains the one or more child components in a placement pattern around the parent component as the parent component moves, the placement pattern comprising locations with respect to the parent component that the child placement module places the one or more child components around the parent component.

9. The apparatus of claim 1, wherein the child placement module places the one or more child components around the parent component to be in compliance with one or more constraints of the parent component in addition to the one or more constraints of the one or more child components.

10. The apparatus of claim 1, wherein the one or more constraints comprise one or more of:
not placing a component directly on top of another component;
height restrictions;
edges of the PCB;
spacing between components;
a maximum trace length between the parent component and a child component;
a signal loss limit;
a propagation delay limit; and
an insertion loss limit.

11. An apparatus comprising:
a constraint highlight module that identifies, on a printed circuit board ("PCB") layout, an allowable area for a component to be placed and one or more prohibited areas within the allowable area where the component is not to be placed in response to a user selecting the component, the component comprising one of a parent component and a child component connected to the parent component, the one or more child components and the parent component identified from component connections of a logic design of an electronic circuit design, wherein identifying the one or more child components comprises excluding a component already placed on the PCB layout and connected to a different parent component, wherein the child component supports the operation of the parent component and electrical signaling flows between the parent component and the child component; and
a constraint de-highlight module that removes identification on the PCB layout of the allowable area and the one or more prohibited areas in response to the user placing the component on the PCB,
wherein at least a portion of said modules comprise one or more of hardware circuits, a programmable hardware device and executable code, the executable code stored on one or more computer readable storage media.

12. The apparatus of claim 11, wherein the selected component comprises a parent component and further comprising:
a child component ID module that identifies one or more child components connected to a parent component in response to a user selecting the parent component; and
a child placement module that places the one or more child components around the parent component in response to the user placing the parent component on the PCB, wherein each child component of the one or more child components is placed with respect to parent component to be in compliance with one or more constraints of the child component.

13. The apparatus of claim 12, wherein the child placement module places each child component based on a wiring length constraint between the parent component and the child component and wherein the child placement module places each child component based on a wiring length constraint and further comprising an additional movement module that highlights one or more child components for further movement that are not in compliance with one or more additional constraints.

14. The apparatus of claim 11, wherein the allowable area and the one or more prohibited areas are defined by one or more of constraints of components placed on the PCB and constraints of the component being placed.

15. The apparatus of claim 11, further comprising a component level module that, in response to the user selecting a component, identifies component levels by identifying each component in a level differently than components in other levels, wherein each level is distinguished by parent-child connections between components of the logic design and the selected component is identified in a parent level.

16. A computer-implemented method comprising:
identifying one or more child components connected to a parent component in response to a user selecting the parent component, the one or more child components identified from component connections of a logic design of an electronic circuit design, wherein the user selects the parent component for placement on a printed circuit board ("PCB"), wherein identifying the one or more child components comprises excluding a component already placed on the PCB layout and connected to the parent component, wherein the child component supports the operation of the parent component and electrical signaling flows from the parent component and the child component; and
placing the one or more child components around the parent component in response to the user placing the parent component on the PCB, wherein each child component of the one or more child components is placed with respect to the parent component to be in compliance with one or more constraints of the one or more child components.

17. The computer-implemented method of claim 16, further comprising identifying, on the PCB, an allowable area for a component to be placed and one or more prohibited areas within the allowable area where the component is not to be placed in response to the user selecting the component, the component comprising one of the parent component and a child component of the one or more child components, wherein the allowable area and the one or more prohibited areas are defined by one or more of constraints of components placed on the PCB and constraints of the component being placed.

18. The computer-implemented method of claim 16, further comprising moving the one or more child components in response to movement of the parent component, wherein the one or more child components are maintained in a placement pattern around the parent component as the parent component moves, the placement pattern comprising locations with respect to the parent component where the one or more child components are placed around the parent component based on one or more constraints of the child components.

19. A computer-implemented method comprising:
identifying, on a printed circuit board ("PCB") layout, an allowable area for a component to be placed and one or more prohibited areas within the allowable area where the component is not to be placed in response to a user selecting the component, the component comprising one of a parent component and a child component connected to the parent component, the one or more child components and the parent component identified from component connections of a logic design of an electronic circuit design, wherein identifying the one or more child components comprises excluding a component already placed on the PCB layout and connected to a different parent component, wherein the child component supports the operation of the parent component and electrical signaling flows between the parent component and the child component; and removing identification on the PCB layout of the allowable area and the one or more prohibited areas in response to the user placing the component on the PCB.

20. The computer-implemented method of claim 19, wherein the selected component comprises a parent component and further comprising:

identifying one or more child components connected to a parent component in response to a user selecting the parent component; and placing the one or more child components around the parent component in response to the user placing the parent component on the PCB, wherein each child component of the one or more child components is placed with respect to the parent component to be in compliance with one or more constraints of the child component.

\* \* \* \* \*